Figure 1:
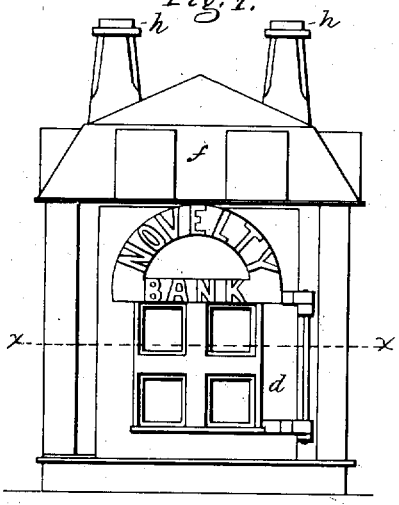

C. C. JOHNSON.

TOY MONEY BOX.

No. 6,734. Reissued Nov. 9, 1875.

Witnesses.

L. H. Latimer,

Wm. Pratt.

Inventor.

Charles C. Johnson per Crosby & Gregory Att'ys.

UNITED STATES PATENT OFFICE

CHARLES C. JOHNSON, OF SOMERVILLE, MASSACHUSETTS, ASSIGNOR TO HORACE PARTRIDGE.

IMPROVEMENT IN TOY MONEY-BOXES.

Specification forming part of Letters Patent No. 144,106, dated October 28, 1873; reissue No. 6,734, dated November 9, 1875; application filed February 8, 1875.

*To all whom it may concern:*

Be it known that I, CHARLES C. JOHNSON, of Somerville, in the county of Middlesex and State of Massachusetts, have invented an Improvement in Toy Banks, of which the following is a specification:

The invention relates to the construction of a toy savings-bank. In my invention I use a toy building made up of cast-metal plates, to represent the four outer walls and the floor and roof of a building, and within the building, dividing the front part thereof from the rear part, I place a metal partition. In the front wall is a door, and between the door and the partition stands an image representing a money-receiver. This image is fixed to a pivot connected with a coiled spring, the stress of which tends to hold the clerk or money-receiver up toward the partition, with his back to the door, and, by a connection between the image and the door, the spring is also made to hold the door closed. Through the partition is a slot, and extending from the image is a plate adapted to deposit the contents through this slot when the door is closed. When the door is opened (against the stress of the spring) the spring-connection between the door and the image causes the image to turn on its pivotal center or bearing, and to face or stand in the open doorway, with his plate extended to receive money. The connection operates as a spring, when the door is wide open, to keep the door open and the image to the front; but when the door is started from this position the stress of the coil-spring tends to shut the door, and with some force. As the door thus shuts, the image, with the money upon the plate, turns and approaches the partition, and the plate, by its movement, throws the money from the plate and inside the partition. It is in this construction, and details pertaining thereto, that my invention consists.

The drawing represents a toy bank embodying my improvements.

Figure 2:
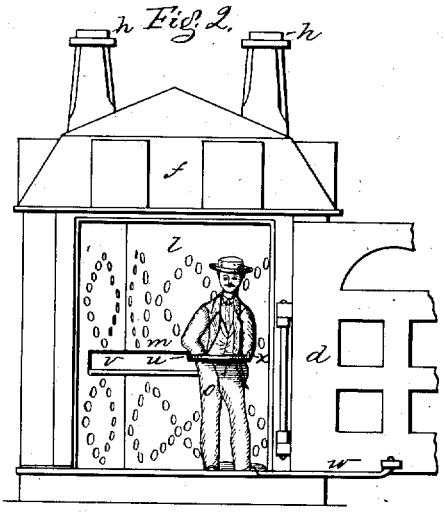
Figure 3:
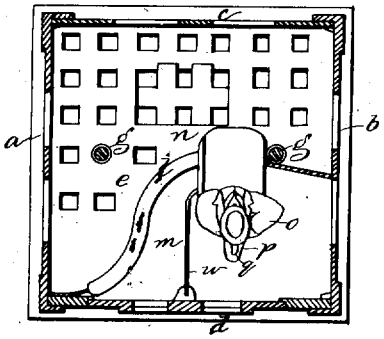
Figure 4:
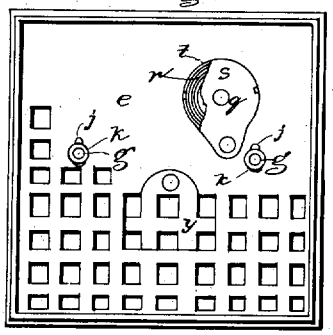

Figure 1 shows the bank in front elevation, the door being closed. Fig. 2 is a similar elevation, with the door open and partially broken away. Fig. 3 is a sectional plan on the line *x x*. Fig. 4 is a bottom view of the bank.

*a b* denote the side plates, *c* the rear plate, and *d* the door, hinged to the front plate. *e* denotes the floor, and *f* the roof. All of these plates are cast in any shape to represent a building, and are formed and joined at the respective edges in any suitable manner, so that, by rods *g*, the whole structure will be held together. These rods are preferably formed with heads or caps *h*, that extend down through the building and pass through holes in the floor. Below the floor the rods are hooked, as seen at *j*, and the hooks extend over circular inclines *k*, which are formed with notches, so that by simply turning the hooks in one direction the rods may be tightened more or less, as may be required to firmly secure the parts together, reverse movements of the hooks loosening the rods, so that the plates may separate. These rods constitute the only fastenings. Within the building is a partition, *l*, which separates the building into two compartments, *m n*. The rear compartment constitutes the deposit room or vault, and the front compartment the receiving-room, and in the latter room is the image *o*, that represents the receiver. This image stands upon one end of a pivoted plate, *p*, having a pin, *q*, at which is fixed one end of a coiled spring, *r*, contained in a case formed by the floor and plate *s* and the rim or flange *t*. The stress of this spring tends to keep the plate *p* turned in, and to hold the image toward the partition, and the front of the image has projecting from it the plate *u*, which, when the image is turned toward the partition, extends through a slot, *v*, in the partition *l*. The end of the plate *p*, opposite to the partition *l*, is connected by a wire link, *w*, with the door *d*, and the wire is so bent that when the door is wide open the link acts as a spring to hold it open. When the door stands open the receiver or image *o* stands with the plate *u* ready to receive money. When a coin is deposited on the plate, and the door is turned somewhat forward, the stress of the spring will constantly tend to close the door. If the door is allowed to close by the force of the spring the plate *u* will carry the money through slot *v*, and the momentum acquired will project the money from the plate, and it will fall into the vault or money-room. The coin is prevented from moving back on the plate by a flange, *x*.

It will be observed that the slot *v* is at a considerable height from the floor, and hence that there is abundant room for receiving a large amount of pennies and other small coins before the slot can become obstructed by the accumulating pile. Flanges *v'* extend from about the slot *v*, within the deposit or money receiving apartment *n*, (see Fig. 3,) and prevent the money from being shaken from the inside of the apartment out through slot *v*. It will also be observed that the opening of the door does not open the money-room, but that the latter is entirely separate from the room into which the door opens, and the money is not accessible through said room. When the money is to be withdrawn access is to be obtained to the bank-vault through a movable or detachable piece or trap-door, *y*, in the floor of the vault, and it is therefore unnecessary to take the bank apart to remove the money. This trap-door or piece *y* can be easily and quickly moved aside to allow the money to be withdrawn, and the walls of the bank are not disturbed.

A number of small openings are cast in the sides and bottom of the money-receiving apartment, which enables the money to be readily seen, and be in a measure counted, through the reticulated sides, and in this way the weight of the money-box is lessened, and material saved to the manufacturer.

I claim—

1. The combination of a toy bank, its outwardly-opening door, and slotted partition, with an image and horizontal plate, connected with the door and operated by the movement thereof to present the image and plate in the open doorway, substantially as for the purpose described.

2. The combination, with a toy bank and slotted partition, of an image and receiving-plate, and a pivoted spring-governed plate on which the image stands, substantially as described.

3. In combination, a toy bank, its slotted partition and hinged door, and a pivoted plate-carrying image, a spring, and a link, all operating substantially as described, to move the image by the act of opening and closing the door, to receive and deposit money through the slotted partition, as set forth.

4. The combination, with the movable door and the image, of the wire link, connecting the door and the image, and arranged to move the image as the door is opened or closed, substantially as described.

5. The combination, with the hinged door, and with image controlled by a spring, of the link connecting the door and image, all arranged to operate substantially as and for the purpose set forth.

6. The combination, with the toy bank, of the rods *g* and the bottom piece provided with the inclines *k*, substantially as shown and described.

7. In combination with a cast-metal reticulated money-box, provided with a slot and with flanges *v'* projecting within the money-receiving apartment, a flanged vibrating money-receiver to receive and deposit the money within the reticulated money-apartment, substantially as described.

8. The combination, with a toy bank and its movable door, of an image mounted on a supporting-plate connected with the floor of the bank, and connected with the door through a link, so as to appear at the open door, or move away from the door as the door is opened or closed, substantially as described.

In testimony whereof I have signed my name to this specification in the presence of two subscribing witnesses.

CHARLES C. JOHNSON.

Witnesses:
HORACE PARTRIDGE,
G. W. GREGORY.